United States Patent
Savage, Jr.

[11] 3,708,894
[45] Jan. 9, 1973

[54] PARLIAMENTARY PROCEDURE GUIDE

[76] Inventor: Dana C. Savage, Jr., 333 E. 4th Street, Dover, Ohio 44622

[22] Filed: Dec. 11, 1970

[21] Appl. No.: 97,117

[52] U.S. Cl. .................................35/21, 40/130 L
[51] Int. Cl. ...........................................G09b 19/00
[58] Field of Search.....................35/21, 1; 40/52 A, 130 L, 132 D

[56] References Cited

UNITED STATES PATENTS

| | | |
|---|---|---|
| 1,132,108 | 3/1915 | Merk-Wirz .................40/132 D X |
| 2,430,205 | 11/1947 | Barry...........................................35/1 |
| 2,865,113 | 12/1958 | King...........................................35/21 |

Primary Examiner—Wm. H. Grieb
Attorney—Larson, Taylor & Hinds

[57] ABSTRACT

An electrical parliamentary procedure guide device for aiding in the conducting of a meeting in accordance with established rules of parliamentary procedure. The face panel of the device includes a series of switches each representing parliamentary motions and a series of indicator lights which are selectively energized upon actuation of a "motion" switch to indicate the applicability of various considerations concerning the regulation of the disposition of the particular motion associated with the actuated switch. For example, whether one or another of a pair of lights is energized upon actuation of a particular motion switch may indicate whether or not a second is required for that motion, whether the motion is debatable and so on. A second series of lights and switches provides an indication of the part of meeting in progress as well as ensures that the meeting progresses in the prescribed order.

9 Claims, 4 Drawing Figures

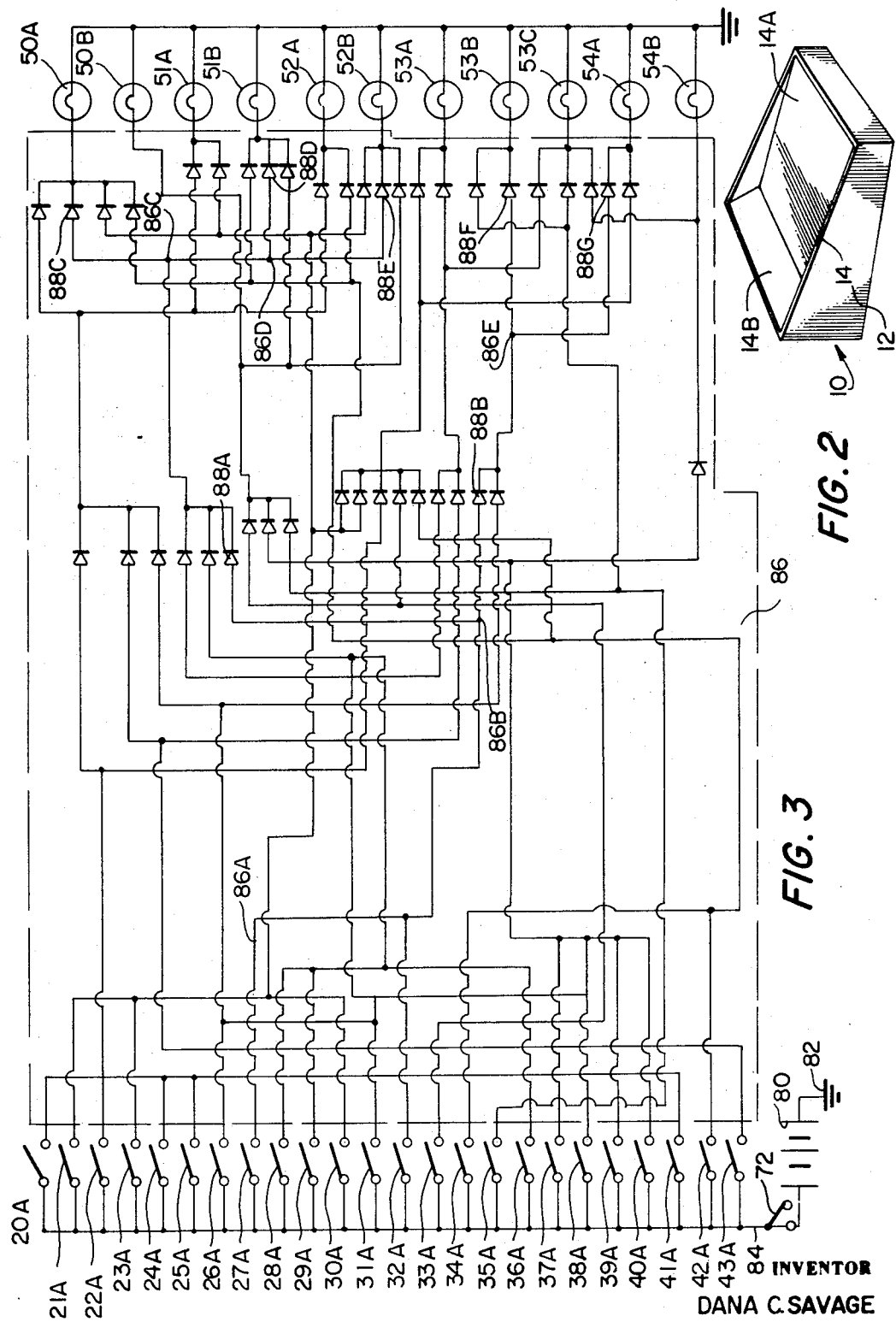

PARLIAMENTARY PROCEDURE GUIDE

FIELD OF THE INVENTION

The present invention generally relates to instructional or educational devices and, in particular, to devices for aiding in conducting of meetings in accordance with established rules of parliamentary procedure.

BACKGROUND OF THE INVENTION

The complexities and intricacies involved in conducting of a meeting according to the rules of parliamentary procedure present serious difficulty to even those tutored in parliamentary law and may in many instances be so overwelming to the layman as to render the rules unworkable. Several books have been written in an attempt to present the established rules in a logical and concise manner, two such books being Roberts' Rules of Order and Cushings' Manual of Parliamentary Practice. However, for the layman to be able to preside over and to conduct a meeting according to the rules of parliamentary procedure requires considerable study, whether formal or informal. Moreover, even with the familiarity with parliamentary procedure provided by such study, because of the complexity of these rules, many questions concerning parliamentary procedure will arise during the course of a meeting to which the layman will not know the answer. Such questions will necessitate taking time during the meeting to consult the published materials to find the answer and will hence result in untimely, and sometimes embarassing, interruptions.

For these reasons, various devices and schemes have been devised as an aid in conducting of the meeting One such device is disclosed in U.S. Pat. No. 2,865,113 granted to King. This device utilizes a guide board provided with a plurality of slidable indicators each representing a parliamentary motion. The manual movement of an indicator causes the uncovering of a plurality of slots which contain the answers to various questions that need to be considered in order to regulate the disposition of the motion. For example, one such a consideration may be whether the motion in question requires a second.

Devices such as that disclosed in the King patent suffer a number of disadvantages. For example, the mechanical manipulation required makes for awkward manual handling and the information provided is not presented in an easily digestable form. However, it is thought that rather than dwell on the shortcomings of the prior art, the various features and advantages of the present invention can be best appreciated by considering the invention itself.

SUMMARY OF THE INVENTION

In accordance with the present invention, an electrical parliamentary procedure guide device is provided which overcomes the disadvantages of the prior art discussed above. In addition, the device of the invention provides rapidly accessible, easy to interpret, visually striking answers regarding considerations concerning the disposition of a motion. Further, the device is relatively inexpensive to construct and extremely simple to operate.

According to a presently preferred embodiment of the invention, the electrical parliamentary procedure guide or instructional device comprises a housing including a face panel having thereon a first set of legends which set forth a series of parliamentary motions and a second set of legends which set forth considerations to be taken into account regarding each of the motions, such as whether a motion is debatable, whether a second is required and the like. A switch is associated with each motion legend and a plurality of visual indicators are associated with the second set of legends. Preferably the second set of legends includes a series of considerations, such as discussed above, set forth in the form of a question and alternate answers to questions, e.g., yes or no, are set forth therebeneath, the visual indicators being positioned adjacent the "answer" legends. Connections are provided between the switches and indicators so that upon actuation of a particular one of the motion switches selected appropriate ones of said indicators are energized so as to provide an indication of the requirements necessary for regulating disposition of the parliamentary motion associated with the actuated switch. This will means that, in the preferred embodiment, the indicators associated with the appropriate answer legends will be energized.

The face panel may also include an "order of the day" section which includes a series of double-pole, double-throw switches and associated visual indicators connected to provide an indication of the progress of the meeting.

Other features and objects of the present invention will be set forth in or apparent from the detailed description of a preferred embodiment found hereinbelow.

BRIEF DESCRIPTION OF THE DRAWINGS

FIG. 2 is a perspective view drawn to a reduced scale, of the device of FIG. 1;

FIG. 3 is a schematic circuit diagram of the electrical circuitry for the principle sections of the device of FIG. 1.

DESCRIPTION OF THE PREFERRED EMBODIMENT

Figure 1:
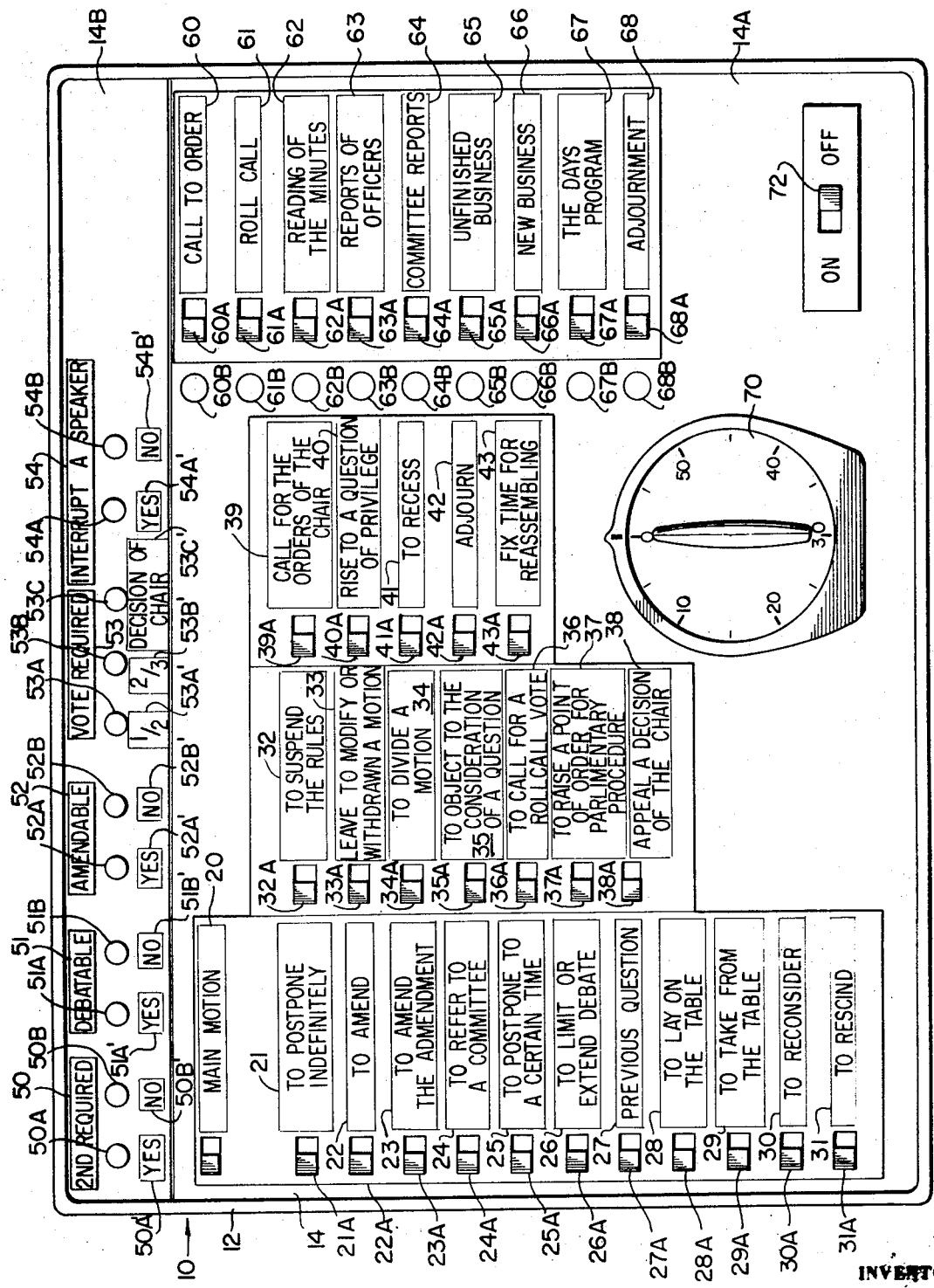
FIG. 1 is a plan view of the face of a device in accordance with a presently preferred embodiment of the invention.

Referring to FIG. 1, a parliamentary procedure guide device 10 constructed in accordance with a presently preferred embodiment of the invention is shown. The device 10 includes a housing 12 having a face panel 14. As shown in FIG. 2, face panel 14 includes a main panel 14A which is generally parallel to the base of device 10 and a further panel 14B arranged in angle with respect to panel 14A. The housing 12 can be constructed from any conventional lightweight material or combination of materials such as sheet metal, plastic, or wood. The preferred overall dimensions and weight of the device are on the order of a large book, thus making the device easily transportable and storable.

For descriptive purposes the face panel 14 may be considered as being arranged into four major sections. The first of these is a "Motions Section" which is located on panel section 14A and comprised of 24 legends 20 to 43 arranged in the embodiment shown in three vertical columns. As shown, legends 20 to 43 set forth 24 parliamentary motions ranging from "main motion" to "motion to adjourn" and "motion to fix time for reassembling". Switches 20A to 43A are respectively individually associated with the motion legends 20 to 43 and are positioned adjacent these legends to the left thereof as shown.

A second section, a "Parliamentary Considerations Section" is located on panel section 14B and includes a horizontal row of five legends 50 to 54. A horizontal row of visual indicators, which can be conventional indicator lamps having colored or clear light shields, is positioned below these legends and includes lamps 50A and 50B associated with legend 50, lamps 51A and 51B associated with legend 51, lamps 52A and 52B associated with legend 52, lamps 53A, 53B and 53C associated with legend 53 and lamps 54 and 54B associated with legend 54. A further series of legends 50A', 50B', 51A', 51B', 52A', 52B', 53A', 53B', 53C', and 54A' and 54B' are individually associated with respective ones of the indicator lamps. The content of the various legends and the interrelationship between the lamps and legends is described in more detail hereinbelow.

Figure 4:
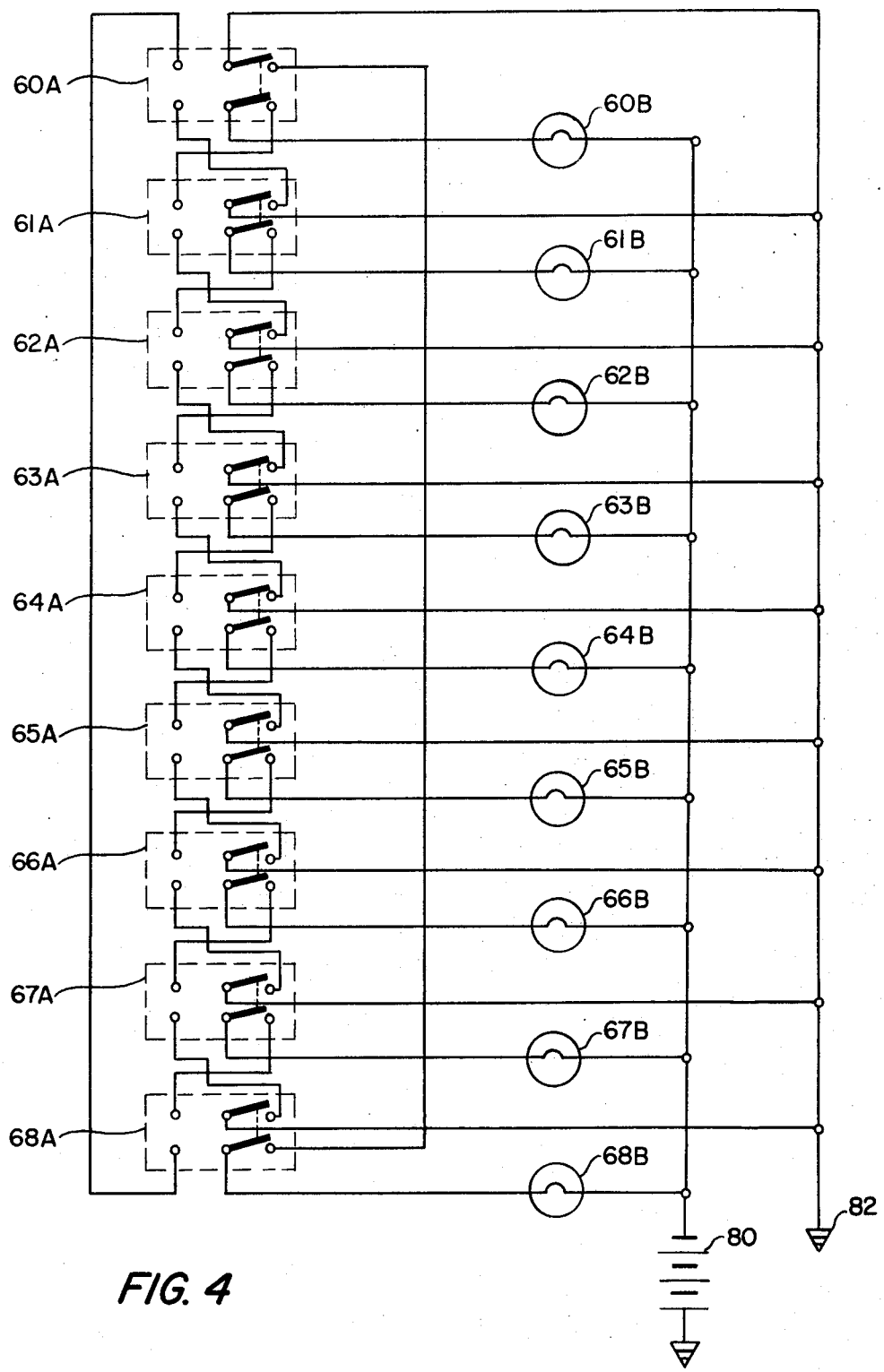
FIG. 4 is a schematic circuit diagram of the "Order of Meeting Section" of the device of FIG. 1.

A third section, an "Order of the Meeting Section", includes a further vertical column of legends 60, 61, 62, 63, 64, 65, 66, 67 and 68, located at the right of the face panel as shown. Switches 60A, 61A, 62A, 63A, 64A, 65A, 66A, 67A and 68A arranged in a vertical column are individually associated with and located adjacent to, at the left of, the legends 60 to 68A. A vertical column of visual indicators 60B, 61B, 62B, 63B, 64B, 65B, 66B, 67B and 68B is associated with, and located to the left of, the column of switches 60A to 68A and the column of legends 60 to 68. Switches 60A to 68A and visual indicators 60B to 68B are also shown in FIG. 4.

Finally, what might be termed an "Auxiliary Section" includes a timer 70, located to the right of the center and near the bottom of the face panel as shown, used for timing debates and the like as well as an ON-OFF power control switch 72 located in the lower right hand corner of the face panel. With minor alterations in the arrangement of the various items discussed above, additional convenience items (not shown), such as a pad of paper, a clipboard, or a chalk board, can be included as part of the Auxiliary Section. It will, of course, be understood that the particular arrangement of the elements and groups of elements shown in FIG. 1 on the face panel is only merely exemplary and that various other arrangements may be employed.

As mentioned above, legends 20 to 43 of the Motions Section of the device set forth 24 parliamentary motions, such as those mentioned in Roberts' Rules of Order. It will be understood that the motions can be listed in number of different ways and, for example, the motions can be grouped into those which take precedence at any time and which when brought up, interrupt any pending motions, and those which are precedence dependent, the motions being listed in the order of their precedence.

Legends 50 to 54 of the Parliamentary Considerations Section set forth various considerations to be taken into account in regulating the disposition of a parliamentary motion. These considerations are set forth in question form and, in the embodiment under consideration, include whether a vote is required (legend 52), and whether a speaker who has the floor may be interrupted (legend 54). These considerations may, of course, be answered either affirmatively or negatively and hence considering legend 50 as exemplary, located directly therebeneath are "answer" legends 50A' and 50B' which read YES or NO respectively. Directly above each answer legend is a corresponding visual indicator, 50A and 50B being positioned above answer legends 50A' and 50B'. Visual indicator 50A represents a YES answer and includes a green colored shield whereas indicator 50B which represents a NO answer, includes a red colored shield. These particular colors are chosen because they are suggestive of the answers represented thereby although plain lamps or other colors may, of course, be used.

Legend 53 is directed to the considerations of whether a vote is required on a particular motion or whether the motion can be decided on by the chair, and if a vote is required, whether one-half or two-thirds majority is needed to carry the motion. Hence legends 53A', 53B' and 53C' read "½", "⅔" and "decision of chair" respectively and energizing of a corresponding one of the associated lights 53A, 53B or 53C provides the required answer.

Legends 60 to 68 of the Order of the Meeting Section set forth the various parts of the meeting arranged in the chronological order of their occurrance, Each part of the meeting is represented by one of switches 60A to 68A and a visual indicator 60B to 68B to indicate the part of the meeting presently in progress. As shown in FIG. 4, in order for a visual indicator to be energized responsive to the positioning or actuation of the switch associated therewith the switches 60A to 68A must be actuated in descending order in accordance with their location in the vertical column on face panel 14 and hence a visual indication of the progress of the meeting is provided. In addition to causing the indicator associated therewith to respond, each switch will cause de-energization of the visual indicator associated with the switch in the vertical position located thereabove. As shown in FIG. 4, indicators 60B to 68B are connected in parallel whereas switches 60A to 68A are double pole-double throw switches, interconnected in a series arrangement and also connected between the visual indicator associated therewith and ground such that each switch in the series, except for switch 60A, requires that the immediately preceding switch in the series be in the ON position before the switch can be actuated to energize the lamp associated therewith. When that switch is placed in the ON position, the immediately preceding switch is de-energized.

Referring to FIG. 3, the electrical circuitry for the "-Motion" and "Parliamentary Considerations" sections is powered by a local power supply or source 80 located within the housing 10. Although, represented in the preferred embodiment as a D.C. battery, source 80 can take the form of a rectifier adapted to be connected to a conventional external A.C. outlet, a rechargeable D.C. power source or simply a plug or connector adapted to be connected to a conventional external A.C. outlet. The power supply 80 is connected between ground 82 and the ON-OFF power control switch 72 described above. A conductor 84 connects the power control switch 72 to an electrically parallel arrangement of switches 20A to 43A described hereinabove. Switches 20A to 43A are selectively connected to lamps 50A, 50B, 51A, 51B, 52A, 52B, 53A, 53B, 53C, 54A and 54B through a network 86 of conductors and diodes in the manner illustrated. Rather than describe in detail all of the connections provided by network 86, exemplary connections will be discussed in considering the operation of the device hereinbelow. The diodes ensure that the current from source 80 will energize the correct visual indicators and prevent the remaining visual indicators from being energized by circulating currents.

In operation, because, in the preferred embodiment thereof, device 10 does not require an external power supply, device 10 may be located near the presiding officer of the meeting. To energize the device the officer merely positions the power control switch 72 in the ON position. The call to order switch 60A is then moved to the ON position, thus energizing the associated visual indicator 60B, and the meeting is called to order. In a similar manner, the presiding officer successively positions the subsequent switches 61A to 68A in the Order of the Meeting Section of the meeting as the meeting progresses, thus energizing the corresponding visual indicator 61B to 68B. Thus, the officer is constantly provided with an indication of the part of the meeting presently in progress as well as the next order of business.

When a motion is made, the presiding officer locates the legend corresponding to that motion in the "Motions Section" and positions the associated switch to the ON position. Selective indicators in each of the groups of visual indicators associated with legends 50 to 54 in the "Parliamentary Considerations Section" will thence be energized indicating the applicability of the various considerations. For example, if the switch 27A associated with the legend 27 "to move the previous question" is positioned to the ON position, visual indicators 50A, 51B, 52B, 53B and 54A will be energized thus indicating that (1)YES, the motion requires a second, (2)NO, the motion is not debatable, (3),NO, the motion is not amendable, (4) that a two-thirds affirmative vote is required to pass the motion and (5) YES, the motion may interrupt a speaker. The officer then positions the switch associated with "Previous Question" to the OFF position.

As shown in FIG. 3, with switch 27A positioned to the ON position current will flow from battery 80 through the switch 27A and conductor 86A to junction 86B, the current then splitting and part flowing through diode 88A and part through diode 88B. The current through diode 88A splits at junction 86C, part passing through a further diode 88C and energizing visual indicator 50A, and part passing to junction 86D where the current again splits, part passing through yet a further diode 88D and energizing visual indicator 51B, and part passing through diode 88E and energizing indicator 52B. The current from diode 88B splits at junction 86E, part passing through diode 88F and energizing visual indicator 53B and part passing through diode 88G and energizing visual indicator 54A.

Although the invention has been described in detail with respect to an exemplary embodiment thereof, it will be understood by those of ordinary skill in the art that variations and modifications may be effected within the scope and spirit of the invention.

I claim:

1. An electrical parliamentary procedure guide device comprising: a housing including a face panel, a first plurality of legends located on said panel setting forth a series of parliamentary motions, a second plurality of legends located on said panel setting forth a series of parliamentary considerations to be taken into account regarding a parliamentary motion, a plurality of switches individually associated with the parliamentary motions set forth in said first plurality of legends, a plurality of visual indicators associated with said second plurality of legends for, when energized, providing, in cooperation with said second plurality of legends, information regarding the considerations set forth in the legends associated therewith, means for connecting said switches to a source of electrical power and a plurality of connecting means for selectively connecting each of said plurality of switches in electrical circuit relationship with said indicators and said power source such that, upon actuation of a particular one of said switches, selected ones of said indicators are energized to provide information regarding the considerations set forth in said second set of legends appropriate to the motion associated with that switch.

2. A device as claimed in claim 1 wherein said second plurality of legends includes a first set of legends which set forth said considerations in question form and a second set of legends which set forth alternative answers to the considerations set forth in said first set of legends.

3. A device as claimed in claim 2 wherein said visual indicators are individually associated with individual legends of said second set of legends.

4. A device as claimed in claim 3 wherein said considerations set forth in said first set of legends include whether a second is required for a motion, whether motion is debatable, whether a motion is amendable and whether a motion may interrupt a speaker, and said second set of legends includes a pair of yes and no legends associated with each of said considerations, a visual indicator being associated with each of said yes and no legends.

5. A device as claimed in claim 4 wherein said considerations set forth in said first set of legends further include the vote required on a motion and the legends in the said second set of legends associated with the vote required consideration read one-half, two-thirds and decision of chair, a visual indicator being associated with each of the last-mentioned legends.

6. A device as claimed in claim 1 wherein said face panel includes means for indicating the progress of a meeting comprising a plurality of further legends setting forth the parts of the meeting in sequence, a like plurality of switches individually associated with said further legends, and a like plurality of visual indicators individually associated with said further switches and said further legends.

7. A device as claimed in claim 1 wherein said visual indicators comprise lamps and the device further includes a timing means.

8. A device as claimed in claim 4 wherein said visual indicators comprise lamps and the lamps associated with said yes and no legends provide green and red colored lights, respectively.

9. A device as claimed in claim 1 further comprising a power source located within said housing for providing the energizing current for said visual indicators.

* * * * *